United States Patent
Ma

(10) Patent No.: US 12,522,224 B2
(45) Date of Patent: Jan. 13, 2026

(54) CHASSIS SIMULATION METHOD AND APPARATUS, SERVER, STORAGE MEDIUM AND PROGRAM PRODUCT

(71) Applicant: Apollo Intelligent Connectivity (Beijing) Technology Co., Ltd., Beijing (CN)

(72) Inventor: Ji Ma, Beijing (CN)

(73) Assignee: Apollo Intelligent Connectivity (Beijing) Technology Co., Ltd., Beijing (CN)

( * ) Notice: Subject to any disclaimer, the term of this patent is extended or adjusted under 35 U.S.C. 154(b) by 1040 days.

(21) Appl. No.: 17/573,453

(22) Filed: Jan. 11, 2022

(65) Prior Publication Data

US 2022/0126847 A1  Apr. 28, 2022

(30) Foreign Application Priority Data

Apr. 30, 2021 (CN) .................. 202110480902.X

(51) Int. Cl.
*B60W 50/02* (2012.01)
*B60W 50/00* (2006.01)
(Continued)

(52) U.S. Cl.
CPC ...... *B60W 50/0205* (2013.01); *B60W 60/001* (2020.02); *G06F 11/3648* (2013.01); *B60W 2050/0031* (2013.01)

(58) Field of Classification Search
CPC ............. B60W 50/0205; B60W 60/001; G06F 11/3648
(Continued)

(56) References Cited

U.S. PATENT DOCUMENTS 9,796,421 B1 * 10/2017 Gupta ................. B60W 40/103
9,868,332 B2 * 1/2018 Anderson ............ B60G 17/016
(Continued)

FOREIGN PATENT DOCUMENTS

CN  108803607 A  11/2018
CN  109765060 A  5/2019
(Continued)

OTHER PUBLICATIONS

Elgharbaw et al. (A Generic Architecture of ADAS Sensor Fault Injection for Virtual Tests, 2016, IEEE, pp. 1-7) (Year: 2016).*
(Continued)

*Primary Examiner* — Iftekhar A Khan
(74) *Attorney, Agent, or Firm* — J.C. PATENTS

(57) ABSTRACT

The present disclosure discloses a chassis simulation method and apparatus, a server, a storage medium and a program product, which relate to the field of artificial intelligence and, in particular, to the field of intelligence driving. The method includes: acquiring a chassis control message transmitted from an automatic driving unit, and acquiring fault injection information; generating simulation information of a chassis status corresponding to the chassis control message according to the chassis control message and the fault injection information; and transmitting the simulation information of the chassis status to the automatic driving unit. The method realizes the chassis simulation scheme based on hardware-in-loop and improves the test authenticity.

13 Claims, 5 Drawing Sheets

(51) Int. Cl.
  *B60W 60/00* (2020.01)
  *G06F 11/362* (2025.01)

(58) Field of Classification Search
  USPC .............................................................. 703/8
  See application file for complete search history.

(56) References Cited

U.S. PATENT DOCUMENTS

| | | | | |
|---|---|---|---|---|
| 10,407,035 | B1* | 9/2019 | Gadda | B60W 10/20 |
| 10,421,465 | B1* | 9/2019 | Jutkowitz | B60W 10/184 |
| 10,742,969 | B1* | 8/2020 | Rohatgi | H04N 17/002 |
| 10,785,474 | B1* | 9/2020 | Semansky | G06V 20/56 |
| 11,714,190 | B1* | 8/2023 | Duncklee | G01S 7/4004 |
| | | | | 342/70 |
| 2003/0176257 | A1* | 9/2003 | Matsumura | B60W 10/02 |
| | | | | 903/945 |
| 2008/0183353 | A1* | 7/2008 | Post | B60G 17/0195 |
| | | | | 701/84 |
| 2009/0193296 | A1* | 7/2009 | Kellington | G06F 11/261 |
| | | | | 714/33 |
| 2009/0271127 | A1* | 10/2009 | Tsang | G07C 5/0816 |
| | | | | 702/34 |
| 2013/0211656 | A1* | 8/2013 | An | G05D 1/0274 |
| | | | | 701/25 |
| 2015/0161025 | A1* | 6/2015 | Baset | G06F 11/2028 |
| | | | | 714/38.1 |
| 2016/0214645 | A1* | 7/2016 | Owen | B60W 10/22 |
| 2016/0334790 | A1* | 11/2016 | Rust | B60T 13/662 |
| 2017/0015323 | A1* | 1/2017 | Oguri | B60W 10/08 |
| 2017/0024299 | A1* | 1/2017 | Deng | G06F 11/3414 |
| 2018/0017950 | A1* | 1/2018 | Zhang | G08G 1/0129 |
| 2018/0059672 | A1* | 3/2018 | Li | B60W 30/0956 |
| 2018/0257663 | A1* | 9/2018 | Jiang | G06F 11/3452 |
| 2018/0273084 | A1* | 9/2018 | Dickson | B62D 5/0457 |
| 2019/0050514 | A1* | 2/2019 | Ceppi | G06F 30/33 |
| 2019/0129831 | A1* | 5/2019 | Goldberg | G06F 11/3698 |
| 2019/0303759 | A1* | 10/2019 | Farabet | G06F 9/455 |
| 2019/0370473 | A1* | 12/2019 | Matrosov | G06N 3/044 |
| 2020/0247393 | A1* | 8/2020 | Danford | G05D 1/0088 |
| 2020/0408889 | A1* | 12/2020 | Nee | G01S 17/931 |
| 2020/0410715 | A1* | 12/2020 | Cadien | G06T 7/70 |
| 2021/0129743 | A1* | 5/2021 | Hsu | B60W 50/14 |
| 2021/0406562 | A1* | 12/2021 | Holzinger | G06F 30/331 |
| 2022/0055653 | A1* | 2/2022 | Ogawa | H04W 4/40 |
| 2022/0068052 | A1* | 3/2022 | Maeta | G07C 5/008 |
| 2022/0089165 | A1* | 3/2022 | Lee | B60W 40/11 |
| 2022/0161848 | A1* | 5/2022 | Cascajar Ordonez | B62D 11/04 |
| 2022/0185271 | A1* | 6/2022 | Cheng | G06V 20/54 |

FOREIGN PATENT DOCUMENTS

| | | |
|---|---|---|
| CN | 110333730 A | 10/2019 |
| CN | 111353221 A | 6/2020 |
| CN | 211236045 U | 8/2020 |
| CN | 111897305 A | 11/2020 |
| CN | 112362365 A | 2/2021 |
| CN | 112684423 A | 4/2021 |
| EP | 3016010 A1 | 5/2016 |
| EP | 3480699 A1 | 5/2019 |
| EP | 3800518 A1 | 4/2021 |
| IN | 201741007888 A | 9/2018 |
| JP | 2008084121 A | 4/2008 |
| JP | 2015123748 A | 7/2015 |
| JP | 2018081400 A | 5/2018 |
| JP | 2019174874 A | 10/2019 |

OTHER PUBLICATIONS

Liu et al. (Chassis Technologies for Autonomous Robots and Vehicles, 2020, John Wiley & Sons Ltd., pp. 23-35) (Year: 2020).*
Sarhadi et al. (State of the art: hardware in the loop modeling and simulation with its applications in design, development and implementation of system and control software, Int. J. Dynam. Control (2015) 3:470-479) (Year: 2015).*
Extended European Search Report of EP221510951.
"Build-up of customized test automation solutions for efficient verification of chassis systems in vehicle HILS", 2017 17th International Conference on Control, Automation and Systems (ICCAS 2017), Oct. 18-21, 2017, Ramada Plaza, Jeju, Korea, pp. 540-544.
"Unified Simulation and Test Platform for Control Systems of Unmanned Vehicles", arxiv.org, Cornell University Library, 201 Olin Library Cornell University Ithaca, NY 14853, Aug. 7, 2019 (Aug. 7, 2019), XP081457613, pp. 1-14.
First Office Action of the parallel application KR0-2022-0007409.
First Office Action of the priority application CN202110480902.X.
First Office Action of the parallel application JP2022-023349.
"Deep Learning Application to Autonomous Driving", Umaji Application to Automatic Operation of * and 3rd Deep Learning, Simulation, Japan, General Incorporated Foundation Japan Society for Simulation Technology, Dec. 15, 2018, 37th vol. No. 4, pp. 48-54.
Notice of Allowance of the priority application CN202110480902.X.

* cited by examiner

US 12,522,224 B2

CHASSIS SIMULATION METHOD AND APPARATUS, SERVER, STORAGE MEDIUM AND PROGRAM PRODUCT

CROSS-REFERENCE TO RELATED APPLICATIONS

This application claims priority to Chinese Patent Application No. 202110480902.X, field on Apr. 30, 2021, which is hereby incorporated by reference in its entirety.

TECHNICAL FIELD

Embodiments of the present disclosure relate to artificial intelligence technology and, in particular, to a chassis simulation method and apparatus, a server, a storage medium and a program product, which may be used in the field of intelligence transportation.

BACKGROUND

In an automatic driving vehicle, an automatic driving unit transmits control commands to a vehicle chassis to control various driving operations of the vehicle, such as throttle, brake, steering, etc., and the automatic driving unit also receives chassis status information fed back by the vehicle chassis, and then performs subsequent control according to the chassis status information.

During a test of the automatic driving unit, there is usually no condition to perform a test by using a real vehicle chassis in a test scenario, thus a mock target is usually disposed on the automatic driving unit to simulate the vehicle chassis. The automatic driving unit transmits a control command, and the mock target directly outputs the chassis status information after 100% executing the control command by the vehicle chassis. After receiving the chassis status information, the automatic driving unit may trigger a control algorithm to run effectively to implement a closed-loop test at a software level.

However, this scheme actually simulates a vehicle chassis completely in an ideal state, which is far from an actual scenario, causing the test to lack authenticity.

SUMMARY

The present disclosure provides a chassis simulation method and apparatus, a server, a storage medium and a program product, which are used for improving test authenticity.

According to an aspect of the present disclosure, a chassis simulation method is provided, which is applied to a server, the server is connected to an automatic driving unit via a hardware interface, and the method includes:
  acquiring a chassis control message transmitted from the automatic driving unit, and acquiring fault injection information;
  generating simulation information of a chassis status corresponding to the chassis control message according to the chassis control message and the fault injection information; and
  transmitting the simulation information of the chassis status to the automatic driving unit.

According to another aspect of the present disclosure, a chassis simulation apparatus is provided, including:
  an acquiring module, configured to acquire a chassis control information transmitted from the automatic driving unit, and acquire fault injection information;
  a simulation module, configured to generate simulation information of a chassis status corresponding to the chassis control message according to the chassis control message and the fault injection information; and
  a transmitting module, configured to transmit the simulation information of the chassis status to the automatic driving unit.

According to still another aspect of the present disclosure, a server is provided, including:
  at least one processor, and a memory connected in communication with the at least one processor; where an command that is executed by at least one processor is stored in the memory, and the command is executed by at least one processor to enable the at least one processor to execute the method according to the first aspect above.

According to yet another aspect of the present disclosure, a non-transitory computer readable storage medium storing a computer command, where the computer command used for enabling a computer to execute the method according to the first aspect above.

According to yet still another aspect of the present disclosure, a computer program product is provided, where the program product includes: a computer program which is stored in a readable storage medium, at least one processor of the electronic device may read the computer program from the readable storage medium, the at least one processor executes the computer program to enable the electronic device to execute the method according to in the first aspect.

According to the technical scheme of the present disclosure, the chassis simulation scheme based on hardware-in-loop is realized, and the test authenticity is improved.

It should understand that the content described in this section is not intend to identify key or important features of embodiments of the present disclosure, nor is it used to limit the scope of the present disclosure. Other features of the present disclosure will be easily understood by the following description.

BRIEF DESCRIPTION OF DRAWINGS

The accompanying drawings are used for better understanding the present scheme, and do not constitute a limitation of the present disclosure.

DETAILED DESCRIPTION OF EMBODIMENTS

Figure 1:
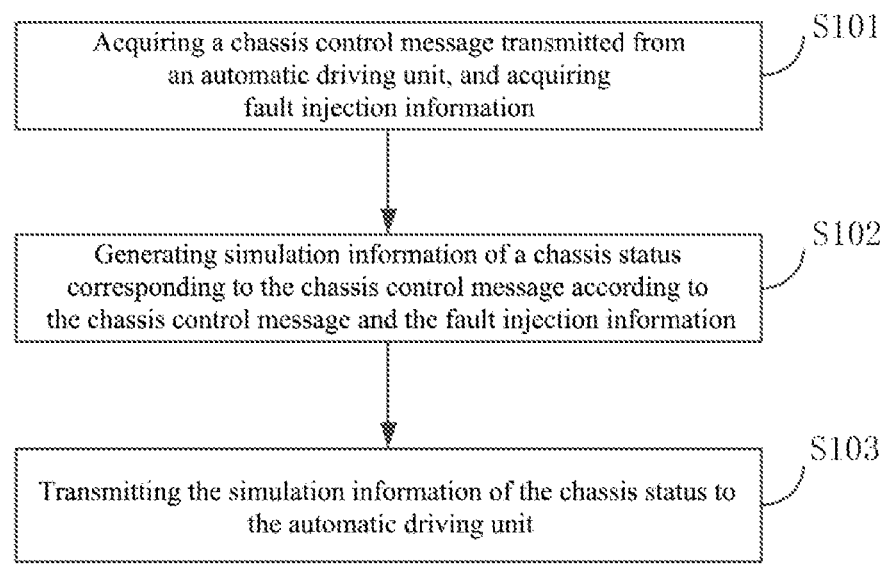
FIG. 1 is a flowchart of a chassis simulation method according to an embodiment of the application.

Exemplary embodiments of the present disclosure are described below in conjunction with the accompanying drawings, including various details of the embodiments of the present disclosure to facilitate understanding, which should be considered only exemplary. Therefore, those of ordinary skilled in the art should recognize that various changes and modifications can be made to the embodiments described herein without departing from the scope and spirit of the present disclosure. Similarly, for clarity and conciseness, the description of well-known functions and structures is omitted in the following description.

An automatic driving unit is a decision control system of an automatic driving vehicle, which is a core module of the automatic driving vehicle. The automatic driving unit outputs a control command to a vehicle via acquiring perception, positioning and chassis status information fed back by a vehicle chassis, so as to control various driving operations of the vehicle, such as throttle, brake, steering, etc. The vehicle chassis executes a corresponding operation according to the control command, and feeds back the chassis status information, such as throttle execution feedback, brake execution feedback, steering execution feedback, vehicle thread, torque, attitude and other information, to the automatic driving unit, thus the automatic driving unit triggers the control algorithm to perform corresponding processing, and then outputs a subsequent control command.

During a test of automatic driving unit, there is usually no condition to perform a test by using a real vehicle chassis in a test scenario, thus a mock target is usually disposed on the automatic driving unit to simulate the vehicle chassis. The automatic driving unit transmits a control command, and the mock target directly outputs the chassis status information after 100% executing the control command by the vehicle chassis. For example, when a throttle opening and closing parameter indicated in the control command is 20%, the mock target returns the throttle execution feedback of 20%. After receiving the chassis status information, the automatic driving unit may trigger the control algorithm to run effectively, thereby achieving a closed loop test.

This scheme is a prefect control software in-loop test scheme, which exists various problems, on the one hand, the mock target is disposed on the automatic driving unit, that is, a tested target is interposed by the mock target, thus it causes interference to the test; on the other hand, this scheme simulates a vehicle chassis totally in an ideal status, moreover, the automatic driving unit interacts with the mock target in pure software, which is far from an actual scenario, causing the test to lack authenticity.

Comparing with the above scheme, vehicle chassis simulation software is used to substitute the mock target in some improvement schemes, that is, the vehicle chassis simulation software is disposed on the automatic driving unit, the automatic driving unit inputs a control command, the vehicle chassis simulation software outputs simulation information of a chassis status through calculating, the automatic driving unit may trigger the control algorithm to run effectively after receiving the chassis status information, thereby achieving the closed loop test. However, this scheme also exists a part of the above problems, on the one hand, the vehicle chassis simulation software is still disposed on the automatic driving unit, that is, the vehicle chassis simulation software is interposed by the tested target, thus it still causes interference to the test; on the other hand, although the vehicle chassis simulation software outputs the simulation information of the chassis status via a method of simulation calculation, the automatic driving unit still interacts with the vehicle chassis simulation software in pure software, which is far from the actual scenario and there is no hardware interface interaction therebetween, such that a logical processing on the automatic driving unit cannot be entirely covered during the test, thus the test still lacks authenticity.

In order to implement a more realistic test, it is necessary for the automatic driving unit to adopt a hardware-in-loop (HIL) test. The HIL test connects a real controller with a false controlled target via the hardware interface, where the false controlled target is simulated by real-time simulation hardware, so as to implement a comprehensive and real test on the controller. In the HIL test of automatic driving unit, the tested target is the automatic driving unit, the real-time hardware needs to include the vehicle chassis control unit, in addition, it can also include a necessary environment sensing sensor unit and a positioning sensing sensor unit. Thus, real-time simulation hardware of the vehicle chassis based on hardware-in-loop is firstly provided in an embodiment of the present disclosure, which is called a virtual chassis, the automatic driving unit is connected with the virtual chassis via a hardware interface, where the hardware interface is the same as the interface between the automatic driving unit and the chassis in the real vehicle. Exemplarily, the virtual chassis may be implemented through a server. The automatic driving unit outputs a control command, and the massage is transmitted to the virtual chassis via the hardware interface, the virtual chassis calculates chassis status information after the vehicle executes the control command, and then feeds back to the automatic driving unit via the hardware interface to implement a closed loop. In order to improve the test authenticity, fault injection logic is added in simulation logic of the virtual chassis, that is, software and hardware faults of the chassis may be simulated via the fault injection logic to ensure that the test is closer to the actual scenario. The chassis simulation method based on the virtual chassis is described below.

FIG. 1 is a flowchart of a chassis simulation method according to an embodiment of the application. The method is applied to a server, the server is connected with the automatic driving unit via a hardware interface, and the server is the virtual chassis described above. The method includes:

S101: acquiring a chassis control message transmitted from an automatic driving unit, and acquiring fault injection information.

The chassis control message transmitted from the automatic driving unit may be any control message of the automatic driving unit on the vehicle chassis in the related technology, such as a throttle control message, a brake control message and a steering control message, which is not limited in the embodiment of the present disclosure. The automatic driving unit transmits the chassis control message to the virtual chassis via a hardware interface between the automatic driving unit and the virtual chassis.

The fault injection information is used to indicate the virtual chassis to inject a simulated fault situation in the subsequent processing of the chassis control message after acquiring the chassis control message. For example, the fault injection information may be configuration information preset in the virtual chassis, and the configuration information may be set according to the actual situation, such as it may be set according to a fault scenario to be tested.

S102: generating simulation information of a chassis status corresponding to the chassis control message according to the chassis control message and the fault injection information.

According to the chassis control message, the virtual chassis generates corresponding simulation information of the chassis status. Exemplarily, the throttle opening and closing parameter is indicated in the chassis control message, therefore, the simulation information of the chassis status includes a corresponding throttle execution feedback.

In the embodiments of the present disclosure, in addition to the chassis control message, the virtual chassis also generates simulation information of the chassis status with combining with the fault injection information, that is, in the processing of generating the simulation information of the chassis status, the virtual chassis may inject fault injection information, so that the generated simulation information of the chassis status is different from that without fault injection.

It should be noted that the fault injection information may also indicate that the fault is not injected, that is, during the processing of the chassis control message, the simulated fault situation is not injected, so as to perform a normal process on the chassis control message to output simulation information of the chassis status without a fault situation.

S103: transmitting the simulation information of the chassis status to the automatic driving unit.

The virtual chassis transmits the simulation information of the chassis status to the automatic driving unit via the hardware interface, so that the automatic driving unit may further perform an arithmetic processing and subsequent control according to the simulation information of the chassis status.

The chassis simulation method provided in the present disclosure uses the virtual chassis based on the hardware-in-loop, the automatic driving unit interacts the virtual chassis through the real hardware interface, and the virtual chassis may generate the simulation information of the chassis status corresponding to the chassis control message based on the chassis control message and the fault injection information, so as to implement the test under the real hardware interface, moreover, according to the fault injection information, it can implement the tests of software and/or hardware fault scenarios, entirely cover the processing logic of the automatic driving unit, and improve the test authenticity. In addition, due to independent setting of the virtual chassis and the automatic driving unit, a decoupling between the test target and the tested target is achieved and the test interference is reduced.

The functions of the virtual chassis and the automatic driving unit are further described below. The virtual chassis and the functional modules of the automatic driving unit are shown in FIG. 2, the virtual chassis is a server, that is, the hardware-in-loop test simulation server shown in the drawing, the hardware-in-loop test simulation server is connected with the automatic driving unit through a controller area network (CAN) port.

Figure 2:
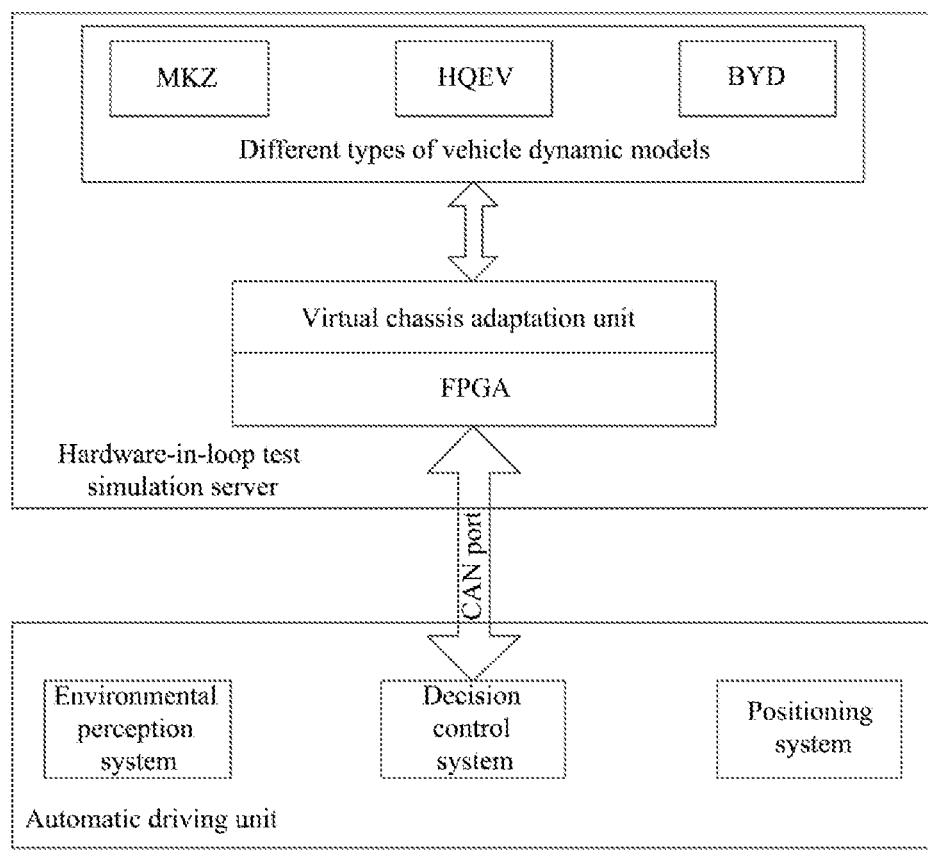
FIG. 2 is a functional module schematic diagram of a virtual chassis and an automatic driving unit according to an embodiment of the present disclosure.

The functional module on the hardware-in-loop test simulation server illustrated in FIG. 2 can divided into the following three sections:

a field programmable gate array (FPGA) register, which is connected to the hardware-in-loop test simulation server via a peripheral component interconnect express (PCIE) interface, and connected to the automatic driving unit via the CAN port, which is used for receiving a CAN message transmitted from the automatic driving unit, and is also used for receiving a CAN message fed back by a virtual chassis adaption unit (Virtual Chassis Adapter) and convert the CAN message into a CAN port signal according to a configured frequency and transmit the CAN port signal to the automatic driving unit;

a Virtual Chassis Adapter, which runs on the hardware-in-loop test simulation server in a form of software and used for decoding a chassis control message that transmitted from the automatic driving unit through the CAN port. The decoded chassis control message is transmitted to the vehicle dynamic module unit, and also used for acquiring the chassis simulation result output by the vehicle dynamic model. In addition, the Virtual Chassis Adapter is further used for performing the fault injection on the chassis control message or the chassis simulation result, performing an encapsulation on the chassis simulation result through the CAN port protocol coding, and then transmitting an encapsulated chassis simulation result to the FPGA register; and a vehicle dynamic module unit, which can use different vehicle dynamic module plugins to run on the hardware-in-loop test simulation server in a form of software, for outputting the chassis simulation result after logic calculation through an internal model code according to the chassis control message (throttle, brake, steering, gear stage, etc.).

Figure 3:
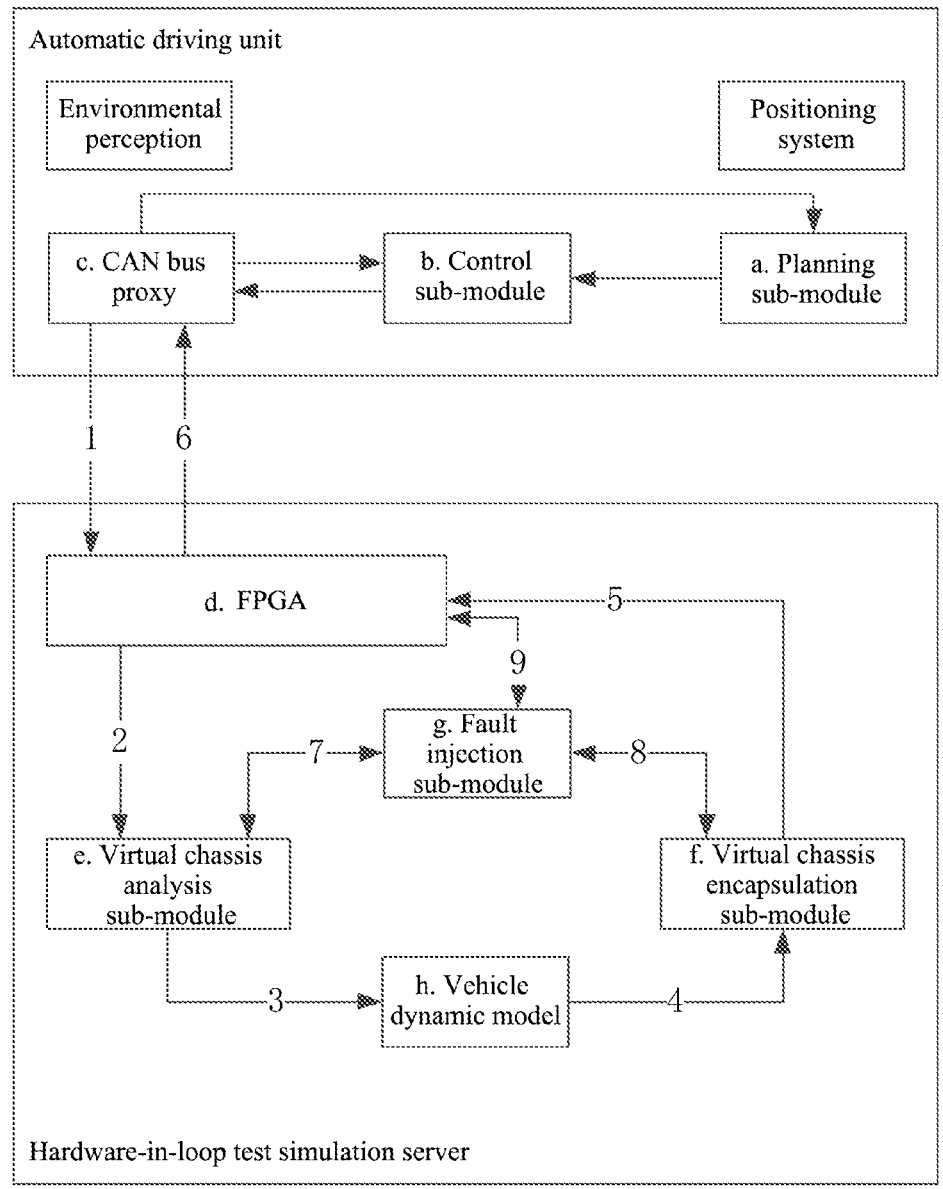
FIG. 3 is a data flow chart according to an embodiment of the present disclosure.

The following will be described in combination with the data flow chart of each software module between the virtual chassis and the automatic driving unit shown in FIG. 3. As shown in FIG. 3, the automatic driving unit includes:

a. a planning sub-module (planning), which is responsible for decision-making and planning such as a path and speed;

b. a control sub-module (control), which is responsible for using a control algorithm to output a control command in combination with the planning and the feedback of the vehicle chassis; and c. a CAN bus proxy (CAN bus proxy), which is responsible for performing a CAN bus format encapsulation on the control command, analyzing and receiving a CAN bus format message fed back by the vehicle chassis, and feeding back the result to the control sub-module and planning sub-module.

The virtual chassis includes:

d. a FPGA, which is responsible for CAN port message receiving and protocol conversion, and supporting various CAN message types, which can be set as required;

e. a virtual chassis decode sub-module (Virtual Chassis Decode), which is responsible for receiving the CAN port message, analyzing and receiving a fault injection, and performing a fault injection control;

f. a virtual chassis encode sub-module (Virtual Chassis Encode), which is responsible for receiving the chassis simulation result of the vehicle dynamic module, encapsulating the chassis simulation result as a CAN port message, receiving the fault injection, and performing the fault injection control;

g. a fault injection sub-module (fault injection), which is responsible for performing the fault injection in real time according to a configuration; and h. a vehicle dynamic module (dynamic simulation), which is responsible for outputting the chassis simulation result after the logic calculation through the internal model code according to the chassis control message.

The aforementioned Virtual Chassis Adapter is constituted by the above three sub-modules e, f and g.

The following is a description of an internal message of the virtual chassis and interactive messages between the virtual chassis and the automatic driving unit.

1. CAN control message (CAN control message), which is a chassis control message transmitted from the automatic driving unit to the virtual chassis, in a CAN format.

2. Control message (command info), which is the internal message of the virtual chassis and read from the FPGA register by the sub-module e.

3. Dynamic model input information (dynamic input info), which is the internal message of the virtual chassis, transmitted from the sub-module e to the sub-module h, and includes the chassis control message decoded by the sub-module e or a decoded chassis control message on which the fault injection is performed.
4. Dynamic model output information (dynamic output info), which is the internal message of the virtual chassis, transmitted from the sub-module h to the sub-module f, and includes the chassis simulation result.
5. Feedback information (feedback info), which is the internal message of the virtual chassis, written to the FPGA register by the sub-module f, and includes the coded chassis simulation result or a coded chassis simulation result on which the fault injection is performed.
6. CAN feedback message (CAN feedback message), which is the feedback message transmitted from the virtual chassis to the automatic driving unit, in CAN format, and includes the simulation information of the chassis status.
7. Fault control information (fault control info), which is the internal message of the virtual chassis and performs the fault injection control at an analysis link.
8. Fault control information (fault control info), which is the internal message of the virtual chassis and performs the fault injection information at the encapsulation link.
9. Fault control information (fault control info), which is the internal message of the virtual chassis and performs the fault injection control at the transmitting link.

Figure 4:
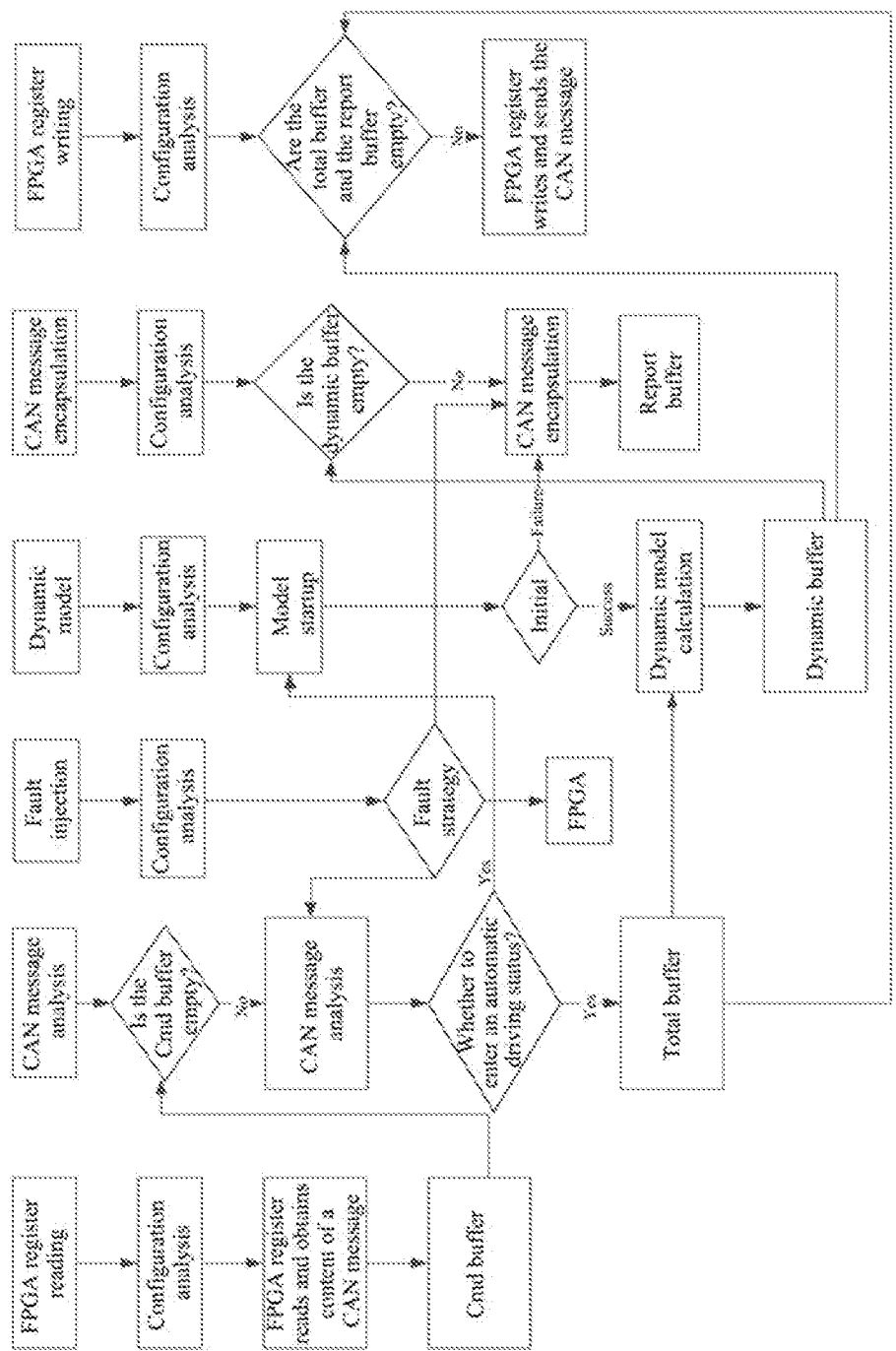
FIG. 4 is a schematic diagram of a thread according to an embodiment of the present disclosure.

The function of each sub-module of the virtual chassis may be implemented via 6 threads shown in FIG. 4, and the software implementation of each sub-module may adopt C language, etc., which is not limited in the embodiments of the present disclosure. The 6 threads include register reading, CAN message analysis, fault injection, vehicle dynamic model, CAN message encapsulation and register writing.

Register reading, which is responsible for acquiring different CAN message content from a FPGA register assigned address space according to set frequency and depositing it to a cmd buffer; after receiving the CAN message from the CAN port, the FPGA register caches it to the configured address space, the CAN message cycle is 20 ms, 50 ms or 100 ms, collection frequencies of different messages are different.

CAN message analysis, which performs the CAN message content analysis, acquires content of the key fields of chassis control message and caches them after processing, at the same time, receives a fault injection strategy control message, performs the fault injection according to different configured strategies, and stores an analyzed message to a total buffer.

Fault injection, which analyzes the fault injection configuration and transmits the fault injection strategy message.

Vehicle dynamic model, which may be a generalized module, inputs the chassis control message, outputs the chassis status information, where the chassis status information is stored into a dynamic buffer. Exemplarily, a dynamic simulation MKZ dynamic model may be used.

CAN message encapsulation, which is used for performing an encapsulation on the CAN message, acquiring information from the dynamic buffer and performing a message encapsulation, at the same time, receiving the fault injection strategy control message, where the fault injection is performed according to different configured strategies, and the encapsulated message is stored into the report buffer.

Register writing, which is responsible for writing data of the total buffer and the report buffer to the FPGA register, where different messages correspond to different register addresses.

According to the above description of the virtual chassis, when generating simulation information of the chassis status, the virtual chassis may perform the fault injection, that is, generating simulation information of the chassis status corresponding to the chassis control message according to the chassis control message and the fault injection information in S102 of the foregoing embodiment, in combination with different timing of the fault injection, specifically, according to the fault injection information, the fault injection is performed on the chassis control message and/or the chassis simulation result corresponding to the chassis control message to obtain the simulation information of the chassis status, and the chassis simulation result is determined according to the chassis control message and the vehicle dynamic model. Thai is, the virtual chassis may perform the fault injection on all links for processing the chassis control message, which is convenient to realize all kinds of fault simulation and has large operation space for safety test.

The fault injection is performed on the chassis control message and/or the chassis simulation result corresponding to the chassis control message may include:
content of a first target field of the chassis control message and/or a second target field of the chassis simulation result corresponding to the chassis control message is modified, or, transmission aging of the chassis control message and/or the chassis simulation result corresponding to the chassis control message is modified. That is, it may modify content of the chassis control message and/or the chassis simulation result corresponding to the chassis control message, so as to implement the test of field changing fault scenario; and it also may modify the transmission failure, so as to implement the test of a fault scenario, such as control delay. It should be noted that the chassis control message may be the decoded chassis control message, and the chassis simulation result may be the chassis simulation result before or after encapsulating.

The following describes different fault injection timing.

In an embodiment, the fault injection control is performed on the analysis link of the chassis control message, as shown in FIG. 3, the fault injection sub-module g transmits the fault injection information to the sub-module e. In this scenario, a processing of the virtual chassis is as follows:

the chassis control message is decoded, and according to the fault injection information, the fault injection is performed on the decoded chassis control message to obtain first control information; the first control information is input into the vehicle dynamic model to obtain the chassis simulation result; and the chassis simulation result is coded to obtain the chassis status simulation information.

In combination with FIG. 3, the sub-module e decodes the chassis control message after acquiring the chassis control message from the sub-module d, at the same time, since the sub-module g transmits the fault injection information to the sub-module e, the sub-module e needs to perform the fault injection on decoded chassis control message. Exemplarily, the first target field of the decoded chassis control message is modified, such as, a throttle opening and closing degree filed is modified from 20% to 30%. Exemplarily, the transmission aging of the decoded chassis control message is modified, such as, by delaying the input of the decoded chassis control message to the sub-module h, the control of the automatic driving unit is delayed. The sub-module e performs the fault injection on the decoded chassis control message to obtain the first control information (3. dynamic module input information), then inputs the first control information into the sub-module h to obtain the chassis simulation result (4. dynamic module input information). The sub-module f then performs an encapsulation on the chassis simulation result (5. feedback information), and the sub-module d performs a CAN port conversion on the encapsulated chassis simulation result to form the chassis simulation information (6. CAN feedback information). Thus, the fault injection at the message analysis link can be realized, which is convenient for fault simulation in this scenario and improves the coverage of the test scenario.

In another embodiment, the fault injection control is performed on the encapsulation link of the chassis control message, as shown in FIG. 3, the sub-module h transmits the chassis simulation result (4. dynamic module input information) to the sub-module f, and the sub-module f performs the encapsulation and the fault injection on the chassis simulation result. In this scenario, a processing of the virtual chassis is as follows:

the chassis control message is decoded to obtain second control information; the second control information is put into the vehicle dynamic model to obtain the chassis simulation result; and the fault injection is performed on the chassis simulation result according to the fault injection information, and the chassis simulation result on which the fault injection is performed is coded to obtain the simulation information of the chassis status.

In combination with FIG. 3, after acquiring the chassis control message from the sub-module d, the sub-module e decodes the chassis control message to obtain the second control information (3. dynamic module input information), and inputs the second control information to the sub-module h to obtain the chassis simulation result (4. dynamic module input information). The sub-module h transmits the chassis simulation result to the sub-module f, since the sub-module g transmits the fault injection information to the sub-module f, thus, the sub-module f needs to perform the fault injection and encapsulation on the chassis simulation result. Exemplarily, the second target field of the chassis simulation result is modified, such as, the throttle execution feedback filed is modified from 20% to 22%. Exemplarily, the transmission aging of the chassis simulation result is modified, such as, by delaying the writing of the encapsulated chassis simulation result to the sub-module d, the automatic driving unit delays receiving the feedback from the virtual chassis. The sub-module f performs an encapsulation on the chassis simulation result on which the fault injection is performed (5. feedback information), and the sub-module d performs the CAN port conversion on an encapsulated chassis simulation result to form the simulation information of chassis status (6. CAN feedback information). Thus, the fault injection of the message encapsulation link can be realized, which is convenient for fault simulation in this scenario and improves the coverage of the test scenario.

In another embodiment, the fault injection control is performed at the link of the CAN port conversion of the sub-module d, as shown in FIG. 3, the sub-module f transmits the encapsulated chassis simulation result (5. feedback information) to the sub-module d, and the sub-module d performs fault injection during CAN port conversion encapsulation. In this scenario, the processing process of the virtual chassis is as follows:

the chassis control message is decoded to obtain third control information; the third control information is input into the vehicle dynamic model to obtain a chassis simulation result; the chassis simulation result is coded to obtain a coded chassis simulation result; and according to the fault injection information, the fault injection is performed on the coded chassis simulation result to obtain the simulation information of the chassis status.

In combination with FIG. 3, after acquiring the chassis control message from the FPGA register, sub-module e decodes the chassis control message to obtain the third control information (3. dynamic module input information), inputs the third control information to the sub-module h to obtain the chassis simulation result (4. dynamic module input information), the sub-module h transmits the chassis simulation result to the sub-module f, after encapsulating the chassis simulation result (5. feedback information), the sub-module f writes a encapsulated chassis simulation result to the sub-module d, since the sub-module g transmits the fault injection information to the sub-module d, the sub-module d needs to perform the fault injection and perform the CAN port conversion encapsulation on the encapsulated chassis simulation result. The way of fault injection is the same as the foregoing description, which may modify the content of the message or modify the transmission aging. Thus, the fault injection of CAN port conversion transmission link can be realized, which is convenient for fault simulation in this scenario and improves the coverage of the test scenario.

Figure 5:
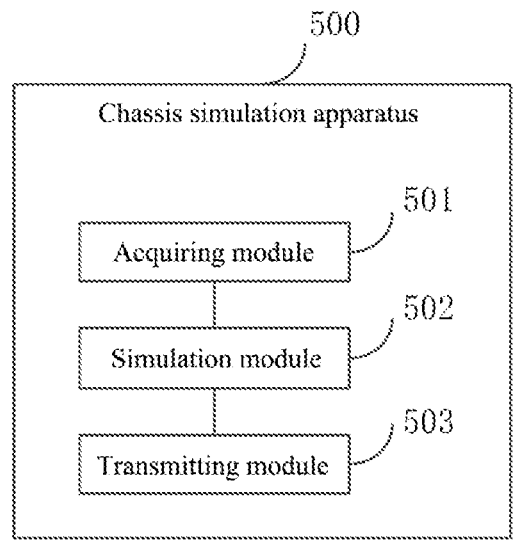
FIG. 5 is a schematic structural diagram of a chassis simulation apparatus according to an embodiment of the present disclosure.

FIG. 5 is a schematic structural diagram of a chassis simulation apparatus according to an embodiment of the present disclosure. As shown in FIG. 5, the chassis simulation apparatus 500 includes:

an acquiring module 501, configured to acquire a chassis control message transmitted from the automatic driving unit, and acquire fault injection information;

a simulation module 502, configured to generate simulation information of a chassis status corresponding to the chassis message according to the chassis control message and the fault injection information; and a transmitting module 503, configured to transmit the simulation information of the chassis status to the automatic driving unit.

In an implementation, the simulation module 502 includes:

a simulation unit, configured to perform, according to the fault injection information, a fault injection on the chassis control message and/or a chassis simulation result corresponding to the chassis control message to obtain the simulation information of the chassis status, where the chassis simulation result is determined according to the chassis control message and a vehicle dynamic model.

In an implementation, the simulation unit includes:

a first decoding unit, configured to decode the chassis control message, and perform, according to the fault injection information, the fault injection on a decoded chassis control message to obtain first control information;

a first simulation unit, configured to input the first control information into to the vehicle dynamic model to obtain a chassis simulation result; and a first coding unit, configured to code the chassis simulation result to obtain the simulation information of the chassis status.

In an implementation, the simulation unit includes:

a second decoding unit, configured to decode the chassis control message to obtain second control information;

a second simulation unit, configured to input the second control information into the vehicle dynamic model to obtain the chassis simulation result; and a second coding unit, configured to perform the fault injection on the chassis simulation result according to the fault injection information, and code a chassis simulation result on which the fault injection is performed to obtain the simulation information of the chassis status.

In an implementation, the simulation unit includes:

a third decoding unit, configured to decode the chassis control message to obtain third control information;

a third simulation unit, configured to input the third control information into the vehicle dynamic model to obtain the chassis simulation result;

a third coding unit, configured to code the chassis simulation result to obtain a coded chassis simulation result; and a fault injection unit, configured to perform the fault injection result on the coded chassis simulation result according to the fault injection information to obtain the simulation information of the chassis status.

In an implementation, the simulation unit includes:

a first modifying unit, configured to modify content of a first target field of the chassis control message and/or a second target field of the chassis simulation result corresponding to the chassis control message.

In one embodiment, the simulation unit includes:

a second modifying unit, configured to modify transmission aging of the chassis control message and/or the chassis simulation result corresponding to the chassis control message.

The chassis simulation apparatus provided by the embodiment of the present disclosure may be used to implement the chassis simulation method in the foregoing method embodiment, and their implementation principles and technical effects are similar, which will not be repeated here.

According to an embodiment of the present disclosure, an electronic device and a non-transitory computer readable storage medium storing a computer command are further provided in the present disclosure. The electronic device may be the foregoing server.

According to an embodiment of the present disclosure, a computer program product is further provided in the present disclosure, where the program product includes: a computer program which is stored in a readable storage medium, at least one processor of the electronic device may read the computer program from the readable storage medium, and at least one processor executes the computer program to enable the electronic device to execute the scheme provided by any one of the above embodiments.

Figure 6:
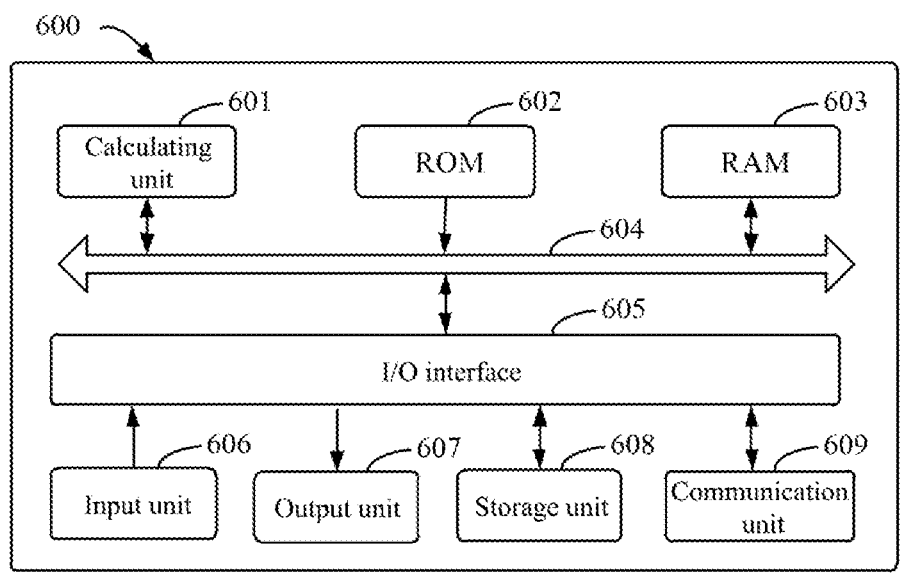
FIG. 6 is a schematic block diagram of an electronic device for implementing a chassis simulation method according to an embodiment of the present disclosure.

FIG. 6 is a schematic block diagram of an electronic device for implementing a chassis simulation method according to an embodiment of the present disclosure. The electronic device is intend to represent various forms of digital computers, such as laptops, desktops, workstations, personal digital assistants, servers, blade servers, mainframe computers, and other suitable computers. The electronic device may also represent various forms of mobile apparatuses, such as personal digital assistants, cellular phones, smart phones, wearable devices, and other similar computing apparatuses. The components, their connections and relationships, and their functions shown herein are merely examples and not intended to limit the implementation of the present disclosure described and/or required herein.

As shown in FIG. 6, the electronic device 600 includes a calculating unit 601, which may execute various appropriate actions and processes according to a computer program stored in a read only memory (ROM) 602 or a computer program loaded from a storage unit 608 into a random access memory (RAM) 603. In the RAM 603, it may also store various programs and data required for the operation of the electronic device 600. The calculating unit 601, the ROM 602 and the RAM 603 are connected with each other through a bus 604. An input/output (I/O) interface 605 is also connected to the bus 604.

Multiple components in the electronic device 600 are connected to the I/O interface 605, including: an inputting unit 606, such as a keyboard, a mouse, etc.; an output unit 607, such as various types of displays, speakers, etc.; a storage unit 608, such as a magnetic disk, an optical disk, etc.; and a communication unit 609, such as a network card, a modem, a wireless communication transceiver, etc. The communication unit 609 allows the electronic device 600 to exchange information/data with other devices via computer networks such as the Internet and/or various telecommunication networks.

The calculating unit 601 may be various general-purpose and/or special-purpose processing components with processing and calculating capabilities. Some examples of the calculating unit 601 include, but are not limited to, a central processing unit (CPU), a graphics processing unit (GPU), various special-purpose artificial intelligence (AI) computing chips, various computing units running machine learning model algorithms, a digital signal processor (DSP), and any appropriate processor, controller, microcontroller, etc. The calculating unit 601 executes various methods and processes described above, such as the chassis simulation method. For example, in some embodiments, the chassis simulation method may be implemented as the computer software program, which is tangibly contained in a machine-readable medium, such as the storage unit 608. In some embodiments, part or all of the computer programs may be loaded and/or installed in the electronic device 600 via the ROM 602 and/or the communication unit 609. When the computer program is loaded into the RAM 603 and executed by the calculating unit 601, one or more steps of the described above chassis simulation method may be executed. Alternatively, in other embodiments, the calculating unit 601 may be configured to execute the chassis simulation method via any other appropriate ways (such as, with the help of firmware).

Various implementations of the systems and technologies described above herein can be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), computer hardware, firmware, software and/or a combination thereof. These various implementations may include: being implemented in one or more computer programs, where the one or more computer programs may be executed and/or explained on the programmable system including at least one programmable processor, the programmable processor may be a special-purpose or general-purpose programmable processor, which may receive data and commands from a storage system, at least one input apparatus and at least one output apparatus, and transmit data and commands to the storage system, at least one input apparatus and at least one output apparatus.

Program codes for implementing the method of the present disclosure may be written in any combination of one or more programming languages. These program codes can be provided to a processor or a controller of a general-purpose computer, a special-purpose computer or other programmable data processing apparatuses, so that when executed by the processor or the controller, the program codes enable the functions/operations specified in the flowchart and/or block diagram to be implemented. The program codes can be executed completely on the machine, partially executed on the machine, partially executed on the machine and partially executed on a remote machine or completely executed on the remote machine or the server as a separate software package.

In the context of the present disclosure, a machine-readable medium may be a tangible medium that may contain or store programs for use by or in combination with a command execution system, an apparatus or a device. The machine-readable medium may be a machine-readable signal medium or a machine-readable storage medium. The machine-readable medium may include, but is not limited to, electronic, magnetic, optical, electromagnetic, infrared, or semiconductor systems, apparatuses or devices, or any suitable combination of the above. More specific examples of the machine-readable storage medium will include electrical connections based on one or more lines, a portable computer disk, a hard disk, a random access memory (RAM), a read only memory (ROM), an erasable programmable read only memory (EPROM or flash memory), an optical fiber, a portable compact disk read only memory (CD-ROM), an optical storage devices, a magnetic storage devices or any suitable combination of the above.

In order to provide interaction with users, the systems and techniques described here may be implemented on a computer including a display apparatus for displaying information to the user (such as a CRT (cathode ray tube) or a LCD (liquid crystal display) monitor); and a keyboard and a pointing apparatus (for example, a mouse or a trackball), through which the user can provide input to the computer. Other kinds of apparatuses can also be used to provide interaction with users; for example, the feedback provided to the user may be any form of sensory feedback (for example, visual feedback, auditory feedback, or tactile feedback); and the input from the user can be received in any form (including acoustic input, voice input or tactile input).

The systems and techniques described here may be implemented in a computing system including a background component (such as a data server), or a computing system including a middleware component (such as an application server), or a computing system including a front-end component (such as a user computer having a graphical user interface or a web browser through which a user can interact with the implementations of the systems and technologies described here), or a computing system including any combination of such background component, middleware component, or front-end component. The components of the system can be connected to each other by digital data communication in any form or medium (for example, communication network). Examples of communication networks include a local area network (LAN), a wide area network (WAN), and the Internet.

The computer system may include a client and a server. The client and the server are generally far away from each other and usually interact through a communication network. A relationship between the client and the server is generated by computer programs running on the corresponding computers and having a client-server relationship with each other. The server can be a cloud server, also known as a cloud computing server or a virtual host. It is a host product in the cloud computing service system to solve defects of difficult management and weak business scalability in the traditional physical host and a VPS (Virtual Private Server, or VPS for short). The server can also be a distributed system server or a block-chain server.

It should be understood that the steps can be reordered, added, or deleted using the various forms of processes shown above. For example, the steps recorded in the present application can be performed in parallel, sequentially, or in different orders, as long as the desired results of the technical solution of the present disclosure can be achieved, which is not limited herein.

The above specific implementations do not limit the scope of protection of the present disclosure. Those skilled in the art should understand that various modifications, combinations, sub-combinations and substitutions can be made according to design requirements and other factors. Any modification, equivalent replacement and improvement made within the spirit and the principles of the present disclosure shall be included in the scope of protection of the present disclosure.

What is claimed is:

1. A chassis simulation method, executed by a processor, applied to a server, wherein the server is connected to an automatic driving unit via a hardware interface, and the method comprises:
   acquiring a chassis control message transmitted from the automatic driving unit, and acquiring fault injection information;
   generating simulation information of a chassis status corresponding to the chassis control message according to the chassis control message and the fault injection information; and
   transmitting the simulation information of the chassis status to the automatic driving unit, so that the automatic driving unit controls a vehicle's driving operation based on the simulation information of the chassis status;
   wherein the generating the simulation information of the chassis status corresponding to the chassis control message according to the chassis control message and the fault injection information comprise:
   performing, according to the fault injection information, a fault injection on the chassis control message and/or a chassis simulation result corresponding to the chassis control message to obtain the simulation information of the chassis status, wherein the chassis simulation result is determined according to the chassis control message and a vehicle dynamic model;
   wherein performing the fault injection on the chassis control message and/or the chassis simulation result corresponding to the chassis control message comprises:
   modifying content of a first target field of the chassis control message and/or a second target field of the chassis simulation result corresponding to the chassis control message.

2. The method according to claim 1, wherein performing, according to the fault injection information, the fault injection on the chassis control message to obtain the simulation information of the chassis status comprises:
   decoding the chassis control message, and performing, according to the fault injection information, the fault injection on a decoded chassis control message to obtain first control information;

inputting the first control information into the vehicle dynamic model to obtain a chassis simulation result; and coding the chassis simulation result to obtain the simulation information of the chassis status.

3. The method according to claim 1, wherein performing the fault injection on the chassis simulation result corresponding to the chassis control message to obtain the simulation information of the chassis status comprises:

decoding the chassis control message to obtain second control information;

inputting the second control information into the vehicle dynamic model to obtain a chassis simulation result; and performing the fault injection on the chassis simulation result according to the fault injection information, and coding a chassis simulation result on which the fault injection is performed to obtain the simulation information of the chassis status.

4. The method according to claim 1, wherein performing the fault injection on the chassis simulation result corresponding to the chassis control message to obtain the simulation information of the chassis status comprises:

decoding the chassis control message to obtain third control information;

inputting the third control information into the vehicle dynamic model to obtain a chassis simulation result;

coding the chassis simulation result to obtain a coded chassis simulation result; and performing the fault injection on the coded chassis simulation result according to the fault injection information to obtain the simulation information of the chassis status.

5. The method according to claim 1, wherein performing the fault injection on the chassis control message and/or the chassis simulation result corresponding to the chassis control message comprises:

modifying transmission aging of the chassis control message and/or the chassis simulation result corresponding to the chassis control message.

6. The method according to claim 2, wherein performing the fault injection on the chassis control message and/or the chassis simulation result corresponding to the chassis control message comprises:

modifying transmission aging of the chassis control message and/or the chassis simulation result corresponding to the chassis control message.

7. The method according to claim 3, wherein performing the fault injection on the chassis control message and/or the chassis simulation result corresponding to the chassis control message comprises:

modifying transmission aging of the chassis control message and/or the chassis simulation result corresponding to the chassis control message.

8. A chassis simulation apparatus, comprising:

at least one processor;

a transceiver connected with the at least one processor; and a memory connected in communication with the at least one processor;

wherein an instruction, when executed by the at least one processor, causes the at least one processor to:

acquire a chassis control message transmitted from a decision control system of an automatic driving vehicle, and acquire fault injection information;

generate simulation information of a chassis status corresponding to the chassis control message according to the chassis control message and the fault injection information; and transmit, through the transceiver, the simulation information of the chassis status to the decision control system, so that the decision control system controls a vehicle's driving operation based on the simulation information of the chassis status;

wherein the instruction further causes the at least one processor to:

perform, according to the fault injection information, a fault injection on the chassis control message and/or a chassis simulation result corresponding to the chassis control message to obtain the simulation information of the chassis status, wherein the chassis simulation result is determined according to the chassis control message and a vehicle dynamic model;

wherein the instruction further causes the at least one processor to:

modify content of a first target field of the chassis control message and/or a second target field of the chassis simulation result corresponding to the chassis control message.

9. The apparatus according to the claim 8, wherein the instruction further causes the at least one processor to:

decode the chassis control message, and perform, according to the fault injection information, the fault injection on a decoded chassis control message to obtain first control information;

input the first control information into to the vehicle dynamic model to obtain a chassis simulation result; and code the chassis simulation result to obtain the simulation information of the chassis status.

10. The apparatus according to the claim 8, wherein the instruction further causes the at least one processor to:

decode the chassis control message to obtain second control information;

input the second control information into the vehicle dynamic model to obtain a chassis simulation result; and perform the fault injection on the chassis simulation result according to the fault injection information, and code a chassis simulation result on which the fault injection is performed to obtain the simulation information of the chassis status.

11. The apparatus according to the claim 8, wherein the instruction further causes the at least one processor to:

decode the chassis control message to obtain third control information;

input the third control information into the vehicle dynamic model to obtain a chassis simulation result;

code the chassis simulation result to obtain a coded chassis simulation result; and perform the fault injection on the coded chassis simulation result according to the fault injection information to obtain the simulation information of the chassis status.

12. The apparatus according to claim 8, wherein the instruction further causes the at least one processor to:

modify transmission aging of the chassis control message and/or the chassis simulation result corresponding to the chassis control message.

13. A non-transitory computer readable storage medium storing a computer command, wherein the computer command is used for enabling a computer to execute the method according to claim 1.

* * * * *